(12) United States Patent
Grubb

(10) Patent No.: US 10,967,987 B2
(45) Date of Patent: Apr. 6, 2021

(54) LOCKING LINE CAPTURE DEVICES FOR UNMANNED AIRCRAFT, AND ASSOCIATED SYSTEMS AND METHODS

(71) Applicant: INSITU, INC., Bingen, WA (US)

(72) Inventor: Matthew Grubb, Bingen, WA (US)

(73) Assignee: INSITU, INC., Bingen, WA (US)

( * ) Notice: Subject to any disclaimer, the term of this patent is extended or adjusted under 35 U.S.C. 154(b) by 53 days.

(21) Appl. No.: 16/533,251

(22) Filed: Aug. 6, 2019

(65) Prior Publication Data

US 2019/0359350 A1  Nov. 28, 2019

Related U.S. Application Data

(62) Division of application No. 15/194,492, filed on Jun. 27, 2016, now Pat. No. 10,407,181.

(51) Int. Cl.
*B64F 1/02* (2006.01)
*B64C 39/02* (2006.01)

(52) U.S. Cl.
CPC ............ *B64F 1/029* (2020.01); *B64C 39/024* (2013.01); *B64F 1/02* (2013.01); *B64C 2201/08* (2013.01); *B64C 2201/182* (2013.01); *B64C 2201/205* (2013.01)

(58) Field of Classification Search
CPC .......... B64F 1/02; B64F 1/029; B64C 39/024
See application file for complete search history.

(56) References Cited

U.S. PATENT DOCUMENTS

| 965,881 A | 8/1910 | Draper |
|---|---|---|
| 968,339 A | 8/1910 | Geraldson |
| 975,953 A | 11/1910 | Hourwich |
| 1,144,505 A | 6/1915 | Steffan |
| 1,164,967 A | 12/1915 | Thorp |

(Continued)

FOREIGN PATENT DOCUMENTS

| CN | 1032645 | 5/1989 |
|---|---|---|
| CN | 101549754 | 10/2009 |

(Continued)

OTHER PUBLICATIONS

European Patent Office, "Extended European Search Report," issued in connection with European Patent Application No. 19216040.6, dated Mar. 18, 2020, 11 pages.

(Continued)

*Primary Examiner* — Michael H Wang
(74) *Attorney, Agent, or Firm* — Hanley, Flight & Zimmerman, LLC

(57) ABSTRACT

Locking line capture devices for unmanned aircraft are disclosed. An example line capture device is configured to be attached to a wing of an unmanned aerial vehicle (UAV). The example line capture device includes a body having a line capture slot. The line capture slot has an open end and a closed end. The example line capture device further includes a retainer having a first lobe, a second lobe, and a third lobe. The retainer is movable relative to the body between a first position in which the first and third lobes are positioned on opposite sides of the line capture slot and the second lobe is positioned over the line capture slot, and a second position in which the first and second lobes are positioned over the line capture slot and the third lobe is positioned clear of the line capture slot.

20 Claims, 11 Drawing Sheets

(56) References Cited

U.S. PATENT DOCUMENTS

| | | | |
|---|---|---|---|
| 1,317,631 A | 9/1919 | Kinser | |
| 1,383,595 A | 7/1921 | Black | |
| 1,384,036 A | 7/1921 | Anderson | |
| 1,428,163 A | 9/1922 | Harriss | |
| 1,499,472 A | 7/1924 | Pratt | |
| 1,530,010 A * | 3/1925 | Neilson | B66C 1/36 |
| | | | 294/82.2 |
| 1,532,736 A | 4/1925 | Dodds | |
| 1,556,348 A | 10/1925 | Ray et al. | |
| 1,624,188 A | 4/1927 | Simon | |
| RE16,613 E | 5/1927 | Moody et al. | |
| 1,634,964 A | 7/1927 | Steinmetz | |
| 1,680,473 A | 8/1928 | Parker | |
| 1,686,298 A | 10/1928 | Uhl | |
| 1,712,164 A | 5/1929 | Peppin | |
| 1,716,670 A | 6/1929 | Sperry | |
| 1,731,091 A | 10/1929 | Belleville | |
| 1,737,483 A | 11/1929 | Verret | |
| 1,738,261 A | 12/1929 | Perkins | |
| 1,748,663 A | 2/1930 | Tucker | |
| 1,749,769 A | 3/1930 | Johnson | |
| 1,756,747 A | 4/1930 | Holland | |
| 1,777,167 A | 9/1930 | Forbes | |
| 1,816,976 A | 8/1931 | Kirkham | |
| 1,825,578 A | 9/1931 | Cernuda | |
| 1,836,010 A | 12/1931 | Audrain | |
| 1,842,432 A | 1/1932 | Stanton | |
| 1,869,506 A | 8/1932 | Richardson | |
| 1,892,357 A | 12/1932 | Moe | |
| 1,909,445 A | 5/1933 | Ahola | |
| 1,912,723 A | 6/1933 | Perkins | |
| 1,925,212 A | 9/1933 | Steiber | |
| 1,940,030 A | 12/1933 | Steiber | |
| 1,960,264 A | 5/1934 | Heinkel | |
| 2,211,089 A | 8/1940 | Berlin | |
| 2,286,381 A | 6/1942 | Rubissow | |
| 2,296,988 A | 9/1942 | Endter | |
| 2,333,559 A | 11/1943 | Grady et al. | |
| 2,342,773 A | 2/1944 | Wellman | |
| 2,347,561 A | 4/1944 | Howard et al. | |
| 2,360,220 A | 10/1944 | Goldman | |
| 2,364,527 A | 12/1944 | Haygood | |
| 2,365,778 A | 12/1944 | Schwab | |
| 2,365,827 A | 12/1944 | Liebert | |
| 2,380,702 A | 7/1945 | Persons | |
| 2,390,754 A | 12/1945 | Valdene | |
| 2,401,853 A | 6/1946 | Bailey | |
| 2,435,197 A | 2/1948 | Brodie | |
| 2,436,240 A | 2/1948 | Wiertz | |
| 2,447,945 A * | 8/1948 | Knowler | B64C 35/005 |
| | | | 114/230.3 |
| 2,448,209 A | 8/1948 | Boyer et al. | |
| 2,465,936 A | 3/1949 | Schultz | |
| 2,488,050 A | 11/1949 | Brodie | |
| 2,488,051 A | 11/1949 | Brodie | |
| 2,515,205 A | 7/1950 | Fieux | |
| 2,526,348 A | 10/1950 | Gouge | |
| 2,669,403 A | 2/1954 | McKay | |
| 2,671,938 A * | 3/1954 | Roberts | A47G 25/32 |
| | | | 24/716 |
| 2,735,391 A | 2/1956 | Buschers | |
| 2,787,185 A | 4/1957 | Rea et al. | |
| 2,814,453 A | 11/1957 | Trimble, Jr. et al. | |
| 2,843,342 A | 7/1958 | Ward | |
| 2,844,340 A | 7/1958 | Daniels et al. | |
| 2,908,240 A | 10/1959 | Hodge | |
| 2,919,871 A | 1/1960 | Sorensen | |
| 2,933,183 A | 4/1960 | Koelsch | |
| 2,937,827 A | 5/1960 | Duce | |
| 2,954,946 A | 10/1960 | O'Neil et al. | |
| 3,069,118 A | 12/1962 | Bernard | |
| RE25,406 E | 6/1963 | Byrne et al. | |
| 3,163,380 A | 12/1964 | Brodie | |
| 3,268,090 A | 8/1966 | Wirkkala | |
| 3,411,398 A | 11/1968 | Blakeley et al. | |
| 3,454,244 A | 7/1969 | Walander |
| 3,468,500 A | 9/1969 | Carlsson |
| 3,484,061 A | 12/1969 | Niemkiewicz |
| 3,512,447 A | 5/1970 | Vaughn |
| 3,516,626 A | 6/1970 | Strance et al. |
| 3,589,651 A | 6/1971 | Niemkiewicz |
| 3,657,956 A | 4/1972 | Bradley et al. |
| 3,672,214 A | 6/1972 | Yasuda |
| 3,684,219 A | 8/1972 | King |
| 3,708,200 A | 1/1973 | Richards |
| 3,765,625 A | 10/1973 | Myhr et al. |
| 3,771,484 A | 11/1973 | Schott et al. |
| 3,827,660 A | 8/1974 | Doolittle |
| 3,939,988 A | 2/1976 | Wellman |
| 3,943,657 A | 3/1976 | Leckie |
| 3,980,259 A | 9/1976 | Greenhalgh et al. |
| 4,037,807 A | 7/1977 | Johnston et al. |
| 4,067,139 A | 1/1978 | Pinkerton et al. |
| 4,079,901 A | 3/1978 | Mayhew et al. |
| 4,143,840 A | 3/1979 | Bernard et al. |
| 4,147,317 A | 4/1979 | Mayhew et al. |
| 4,149,840 A | 4/1979 | Tippmann |
| D256,816 S | 9/1980 | McMahon et al. |
| 4,236,686 A | 12/1980 | Barthelme et al. |
| 4,238,093 A | 12/1980 | Siegel et al. |
| 4,267,987 A | 5/1981 | McDonnell |
| 4,279,195 A | 7/1981 | Miller |
| 4,296,894 A | 10/1981 | Schnäbele et al. |
| 4,296,898 A | 10/1981 | Watson |
| 4,311,290 A | 1/1982 | Koper |
| 4,372,016 A | 2/1983 | LaViolette et al. |
| 4,408,737 A | 10/1983 | Schwaerzler |
| 4,410,151 A | 10/1983 | Höppner et al. |
| 4,457,479 A | 7/1984 | Daude |
| 4,471,923 A | 9/1984 | Höppner et al. |
| 4,523,729 A | 6/1985 | Frick |
| 4,566,658 A | 1/1986 | DiGiovanniantonio et al. |
| 4,645,142 A | 2/1987 | Soelter |
| 4,653,706 A | 3/1987 | Ragiab |
| 4,678,143 A | 7/1987 | Griffin |
| 4,730,793 A | 3/1988 | Thurber, Jr. et al. |
| 4,753,400 A | 6/1988 | Reuter et al. |
| 4,790,497 A | 12/1988 | Yoffe |
| 4,809,933 A | 3/1989 | Buzby et al. |
| 4,842,222 A | 6/1989 | Baird |
| 4,909,458 A | 3/1990 | Martin |
| 4,979,701 A | 12/1990 | Colarik et al. |
| 4,991,739 A | 2/1991 | Levasseur |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor |
| 5,060,888 A | 10/1991 | Vezain et al. |
| 5,109,788 A | 5/1992 | Heinzmann |
| 5,119,935 A | 6/1992 | Stump et al. |
| 5,145,129 A | 9/1992 | Gebhard |
| 5,176,339 A | 1/1993 | Schmidt |
| 5,222,694 A | 6/1993 | Smoot |
| 5,253,605 A | 10/1993 | Collins |
| 5,253,606 A | 10/1993 | Ortelli |
| 5,259,574 A | 11/1993 | Carrot |
| 5,378,851 A | 1/1995 | Brooke et al. |
| 5,390,550 A | 2/1995 | Miller |
| 5,407,153 A | 4/1995 | Kirk et al. |
| 5,509,624 A | 4/1996 | Takahashi |
| 5,583,311 A | 12/1996 | Rieger |
| 5,603,592 A | 2/1997 | Sadri et al. |
| 5,655,944 A | 8/1997 | Fusselman |
| 5,687,930 A | 11/1997 | Wagner et al. |
| 5,762,456 A | 6/1998 | Aasgaard |
| 5,816,761 A | 10/1998 | Cassatt et al. |
| 5,906,336 A | 5/1999 | Eckstein |
| 5,913,479 A | 6/1999 | Westwood, III |
| 6,161,797 A | 12/2000 | Kirk et al. |
| 6,237,875 B1 | 5/2001 | Menne et al. |
| 6,264,140 B1 | 7/2001 | McGeer et al. |
| 6,343,768 B1 | 2/2002 | Muldoon |
| 6,370,455 B1 | 4/2002 | Larson et al. |
| 6,371,410 B1 | 4/2002 | Cairo-Iocco et al. |

(56) References Cited

U.S. PATENT DOCUMENTS

| | | | |
|---|---|---|---|
| 6,416,019 B1 | 7/2002 | Hilliard et al. | |
| 6,442,460 B1 | 8/2002 | Larson et al. | |
| 6,457,673 B1 | 10/2002 | Miller | |
| 6,478,650 B1 | 11/2002 | Tsai | |
| 6,626,077 B1 | 9/2003 | Gilbert | |
| 6,695,255 B1 | 2/2004 | Husain | |
| 6,758,440 B1 | 7/2004 | Repp et al. | |
| 6,772,488 B1 | 8/2004 | Jensen et al. | |
| 6,835,045 B1 | 12/2004 | Barbee et al. | |
| 6,874,729 B1 | 4/2005 | McDonnell | |
| 6,925,690 B2 | 8/2005 | Sievers | |
| 7,059,564 B2 | 6/2006 | Dennis | |
| 7,066,430 B2 | 6/2006 | Dennis et al. | |
| 7,090,166 B2 | 8/2006 | Dennis et al. | |
| 7,114,680 B2* | 10/2006 | Dennis | B64C 39/024 244/63 |
| 7,121,507 B2 | 10/2006 | Dennis et al. | |
| 7,128,294 B2 | 10/2006 | Roeseler et al. | |
| 7,140,575 B2* | 11/2006 | McGeer | B64C 39/024 244/63 |
| 7,143,974 B2 | 12/2006 | Roeseler et al. | |
| 7,152,827 B2 | 12/2006 | McGeer | |
| 7,155,322 B2 | 12/2006 | Nakahara et al. | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,259,357 B2 | 8/2007 | Walker | |
| 7,264,204 B1 | 9/2007 | Portmann | |
| 7,410,125 B2 | 8/2008 | Steele | |
| 7,422,178 B2 | 9/2008 | DeLaune | |
| 7,472,461 B2 | 1/2009 | Anstee | |
| 7,510,145 B2 | 3/2009 | Snediker | |
| 7,578,467 B2 | 8/2009 | Goodrich | |
| 7,686,247 B1 | 3/2010 | Monson et al. | |
| 7,740,210 B2 | 6/2010 | Pilon et al. | |
| 7,748,661 B2 | 7/2010 | Harris et al. | |
| 7,798,445 B2 | 9/2010 | Heppe et al. | |
| 7,806,366 B2 | 10/2010 | Jackson | |
| 8,016,073 B2 | 9/2011 | Petzl et al. | |
| 8,028,952 B2 | 10/2011 | Urnes, Sr. | |
| 8,038,090 B2 | 10/2011 | Wilson et al. | |
| 8,136,766 B2 | 3/2012 | Dennis | |
| 8,172,177 B2 | 5/2012 | Lovell et al. | |
| 8,205,537 B1 | 6/2012 | Dupont | |
| 8,313,057 B2 | 11/2012 | Rednikov | |
| 8,348,714 B2 | 1/2013 | Newton et al. | |
| 8,387,540 B2 | 3/2013 | Merems | |
| 8,683,770 B2 | 4/2014 | diGirolamo et al. | |
| 8,820,698 B2 | 9/2014 | Balfour et al. | |
| 8,944,373 B2 | 2/2015 | Dickson et al. | |
| 8,950,124 B2 | 2/2015 | Wellershoff | |
| 9,085,362 B1 | 7/2015 | Kilian et al. | |
| 9,266,610 B2 | 2/2016 | Knapp et al. | |
| 9,340,301 B2 | 5/2016 | Dickson et al. | |
| 9,359,075 B1 | 6/2016 | von Flotow et al. | |
| 9,932,110 B2* | 4/2018 | McNally | B64C 39/024 |
| 2002/0011223 A1 | 1/2002 | Zauner et al. | |
| 2002/0049447 A1 | 4/2002 | Li | |
| 2002/0100838 A1 | 8/2002 | McGeer et al. | |
| 2003/0116107 A1 | 6/2003 | Laimbock | |
| 2003/0122384 A1 | 7/2003 | Swanson et al. | |
| 2003/0202861 A1 | 10/2003 | Nelson et al. | |
| 2003/0222173 A1 | 12/2003 | McGeer et al. | |
| 2004/0129833 A1 | 7/2004 | Perlo et al. | |
| 2004/0232282 A1 | 11/2004 | Dennis | |
| 2005/0017129 A1 | 1/2005 | McDonnell | |
| 2005/0132923 A1 | 6/2005 | Lloyd | |
| 2005/0187677 A1 | 8/2005 | Walker | |
| 2006/0006281 A1 | 1/2006 | Sirkis | |
| 2006/0091258 A1 | 5/2006 | Chiu et al. | |
| 2006/0102783 A1 | 5/2006 | Dennis et al. | |
| 2006/0175466 A1 | 8/2006 | Snediker et al. | |
| 2006/0249623 A1 | 11/2006 | Steele | |
| 2006/0271251 A1 | 11/2006 | Hopkins | |
| 2007/0023582 A1 | 2/2007 | Steele et al. | |
| 2007/0051849 A1 | 3/2007 | Watts et al. | |
| 2007/0158498 A1 | 7/2007 | Snediker | |
| 2007/0200027 A1 | 8/2007 | Johnson | |
| 2007/0261542 A1 | 11/2007 | Chang et al. | |
| 2008/0156932 A1 | 7/2008 | McGeer et al. | |
| 2008/0191091 A1* | 8/2008 | Hoisington | B64C 39/024 244/110 F |
| 2009/0114761 A1 | 5/2009 | Sells, II | |
| 2009/0191019 A1 | 7/2009 | Billings | |
| 2009/0194638 A1 | 8/2009 | Dennis | |
| 2009/0224097 A1 | 9/2009 | Kariv | |
| 2009/0236470 A1 | 9/2009 | Goossen et al. | |
| 2009/0294584 A1 | 12/2009 | Lovell et al. | |
| 2010/0181424 A1 | 7/2010 | Goossen et al. | |
| 2010/0237183 A1 | 9/2010 | Wilson et al. | |
| 2010/0243799 A1 | 9/2010 | Al-Qaffas | |
| 2010/0276537 A1 | 11/2010 | Kutzmann et al. | |
| 2010/0318475 A1 | 12/2010 | Abrahamson | |
| 2012/0210853 A1 | 8/2012 | Abershitz et al. | |
| 2012/0223182 A1 | 9/2012 | Gilchrist, III et al. | |
| 2013/0082137 A1 | 4/2013 | Gundlach et al. | |
| 2013/0320138 A1* | 12/2013 | Dickson | B64F 1/04 244/110 F |
| 2014/0117147 A1 | 5/2014 | Hanna et al. | |
| 2015/0129716 A1 | 5/2015 | Yoffe | |
| 2015/0166177 A1 | 6/2015 | Bernhardt | |
| 2015/0239578 A1 | 8/2015 | McGeer | |
| 2016/0023760 A1 | 1/2016 | Goodrich | |
| 2016/0114906 A1 | 4/2016 | McGeer et al. | |
| 2016/0137311 A1 | 5/2016 | Peverill et al. | |
| 2016/0144980 A1 | 5/2016 | Kunz et al. | |
| 2016/0152339 A1 | 6/2016 | von Flotow et al. | |
| 2016/0264259 A1 | 9/2016 | Dickson et al. | |
| 2016/0327945 A1 | 11/2016 | Davidson | |
| 2016/0375981 A1 | 12/2016 | McDonnell | |
| 2017/0225784 A1 | 8/2017 | Hayes et al. | |
| 2017/0369185 A1 | 12/2017 | Grubb | |
| 2018/0162528 A1 | 6/2018 | McGrew et al. | |
| 2019/0003511 A1 | 1/2019 | Leon et al. | |
| 2019/0006749 A1 | 1/2019 | Mack et al. | |

FOREIGN PATENT DOCUMENTS

| | | |
|---|---|---|
| CN | 102384702 | 3/2012 |
| DE | 4301671 | 7/1993 |
| DE | 19602703 | 2/1997 |
| DE | 102010010508 | 9/2011 |
| EP | 0742366 | 9/1998 |
| FR | 854371 | 4/1940 |
| GB | 1445153 | 8/1976 |
| GB | 2080216 | 2/1982 |
| GB | 2093414 | 9/1982 |
| GB | 2150895 | 7/1985 |
| GB | 2219777 | 12/1989 |
| GB | 2231011 | 11/1990 |
| IL | 76726 | 1/1991 |
| JP | 07304498 | 11/1995 |
| JP | 2008540217 | 11/2008 |
| WO | 0075014 | 12/2000 |
| WO | 0107318 | 2/2001 |
| WO | 2008015663 | 2/2008 |
| WO | 2011066400 | 6/2011 |
| WO | 2012047677 | 4/2012 |
| WO | 2014080386 | 5/2014 |

OTHER PUBLICATIONS

"Ames Builds Advanced Yawed-Wing RPV," Aviation Week and Space Technology, Jan. 22, 1973, 2 pages.

Robinson, "Dynamic Analysis of a Carousel Remotely Piloted Vehicle Recovery System," 1977, Naval Post-Graduate School Master's Thesis No. ADA052401, 70 pages.

Whitmore, "Development of a Closed-Loop Strap Down Attitude System for an Ultrahigh Altitude Flight Experiment," Jan. 1997, NASA Technical Memorandum 4775, 31 pages.

Dorr, "The XF-85 Goblin," https://www.defensemedianetwork.com/stories/the-sf-85-goblin-the-parasite-fighter-that-didnt-work/, DefenseMediaNetwork, Sep. 11, 2014, 5 pages.

(56) References Cited

OTHER PUBLICATIONS

Gross, "Investigation of Lift, Drag, and Aeordynamic Pitching Moment During In-Flight Recovery of a Remotely Piloted Vehicle," Air Force Institute of Technology, NTIS, Sep. 1973, 99 pages.
Phillips, "Alternate Aquila Recovery System Demonstration Recovery System Flight Test," Final Report, Jan. 19, 20177, 67 pages.
Plane Talk, The Newsletter of the War Eagles Air Museum, www.war-eagles-air-museum.com, vol. 25, No. 1, First Quarter Jan.-Mar. 2012, 8 pages.
Dickard, "Mini-RPV Recover System Conceptual Study," Contract DA4J02-76-C-0048, Report No. USAAMRDL-TR077-24, 321 pages.
Hunton et al., "An Investigation of the McDonnell XP-85 Airplane in the Ames 40 by 80 Foot Wind Tunnel—Force and Moment Tests," NACA Research Memorandum for the Air Material Command, U.S. Air Force, National Advisory Committee for Aeronautics, Sep. 27, 1948, 155 pages. (Uploaded in 2 parts).
Galinski et al., "Results of the Gust Resistant MAV Programme," 28th International Congress of the Aeronautical Sciences, 2012, 10 pages.
European Patent Office, "Extended European Search Report," issued in connection with European Patent Application No. 17177785.7, dated Nov. 8, 2017, 8 pages.
United States Patent and Trademark Office, "Final Office Action," issued in connection with U.S. Appl. No. 15/194,492, dated Apr. 4, 2019, 26 pages.
United States Patent and Trademark Office, "Non-Final Office Action," issued in connection with U.S. Appl. No. 15/194,492, dated May 3, 2018, 38 pages.
United States Patent and Trademark Office, "Notice of Allowance and Fee(s) Due," issued in connection with U.S. Appl. No. 15/194,492, dated Jun. 18, 2019, 23 pages.
State of Israel, The Patent Authority, "Notification of Deficiencies in Patent Application," issued in connection with Israeli Patent Application No. 252290, dated Dec. 21, 2020, 8 pages.

* cited by examiner

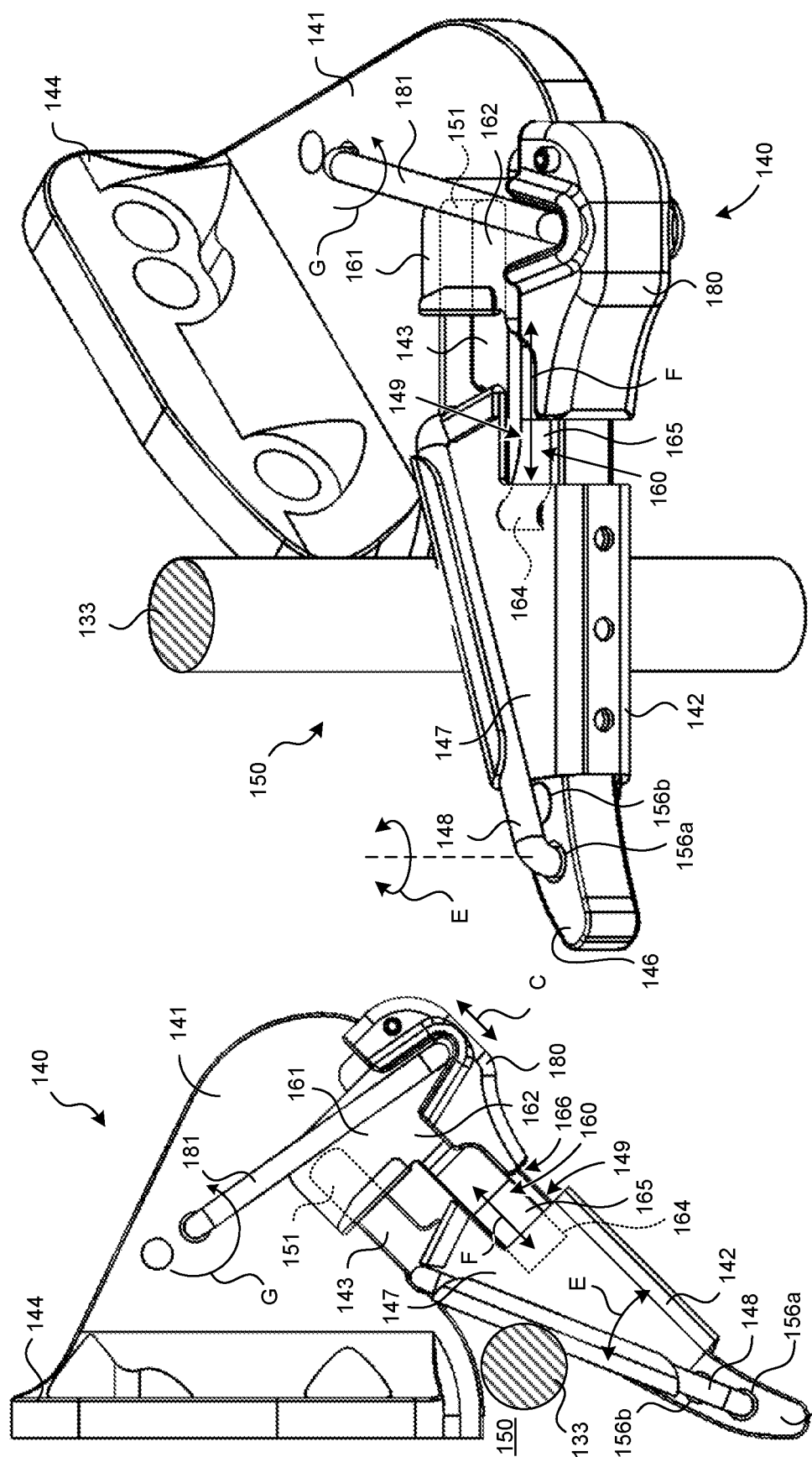

LOCKING LINE CAPTURE DEVICES FOR UNMANNED AIRCRAFT, AND ASSOCIATED SYSTEMS AND METHODS

CROSS-REFERENCE TO RELATED APPLICATION

This application arises from a division of U.S. patent application Ser. No. 15/194,492, filed Jun. 27, 2016. The entirety of U.S. patent application Ser. No. 15/194,492 is hereby incorporated herein by reference.

TECHNICAL FIELD

The present technology is directed generally to locking line capture devices for unmanned aircraft, and associated systems and methods.

BACKGROUND

Unmanned aircraft or aerial vehicles (UAVs) provide enhanced and economical access to areas where manned flight operations are unacceptably costly and/or dangerous. For example, UAVs outfitted with remotely controlled cameras can perform a wide variety of surveillance missions, including spotting schools of fish for the fisheries industry, monitoring weather conditions, providing border patrols for national governments, and providing military surveillance before, during and/or after military operations.

Existing UAV systems suffer from a variety of drawbacks. For example, existing UAVs systems (which can include the aircraft itself along with launch devices, recovery devices, and storage devices) typically require substantial space. Accordingly, these systems can be difficult to install and operate in cramped quarters, such as the deck of a small fishing boat, land vehicle, or other craft. Another drawback with some existing UAVs is that, due to small size and low weight, they can be subjected to higher acceleration and deceleration forces than larger, manned aerial vehicles and can accordingly be prone to damage, particularly when manually handled during recovery and launch operations in hostile environments, such as a heaving ship deck. Yet another drawback with some existing UAV systems is that they may not be suitable for recovering aircraft in tight quarters, without causing damage to either the aircraft or the platform from which the aircraft is launched and/or recovered. Accordingly, there remains a need in the industry for improved methods for operating UAVs in confined environments.

BRIEF DESCRIPTION OF THE DRAWINGS

FIGS. 3A and 3B are partially schematic, plan and isometric views, respectively, of the line capture device shown in FIG. 2, with a recovery line positioned to enter a line slot of the device in accordance with an embodiment of the present technology.

DETAILED DESCRIPTION

The present technology is directed generally to unmanned aerial vehicles (UAVs) having locking capture devices, and associated systems and methods. In particular embodiments, the capture devices are mounted on the wing tips of the UAV and are used to "snag" the UAV on a recovery line, thus eliminating the need for a runway, net, and/or other landing arrangement. A representative capture device includes a slot and a retainer that can prevent the recovery line from disengaging from the slot once the UAV has been captured. A locking device further secures the retainer, and can be released by the operator after the UAV has been captured in preparation for detaching the UAV from the recovery line.

Several details describing structures or processes that are well-known and often associated with UAVs and corresponding systems and subsystems, but that may unnecessarily obscure some significant aspects of the disclosed technology, are not set forth in the following description for purposes of clarity. Moreover, although the following disclosure sets forth several embodiments of different aspects of the technology, some other embodiments can have different configurations and/or different components than those described in this section. Accordingly, the technology may have other embodiments with additional elements and/or without several of the elements described below with reference to FIGS. 1A-10D.

Figure 1A:
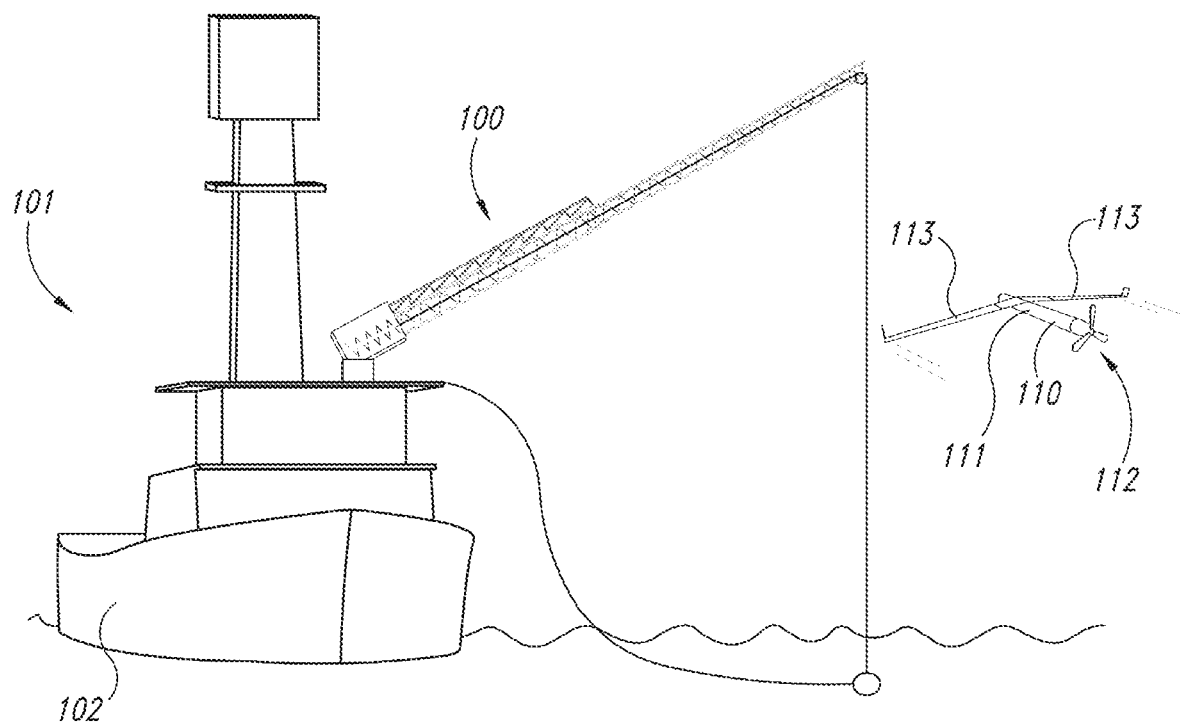
FIGS. 1A-1B illustrate an apparatus configured to recover UAVs in accordance with representative embodiments of the present technology.
Figure 1B:
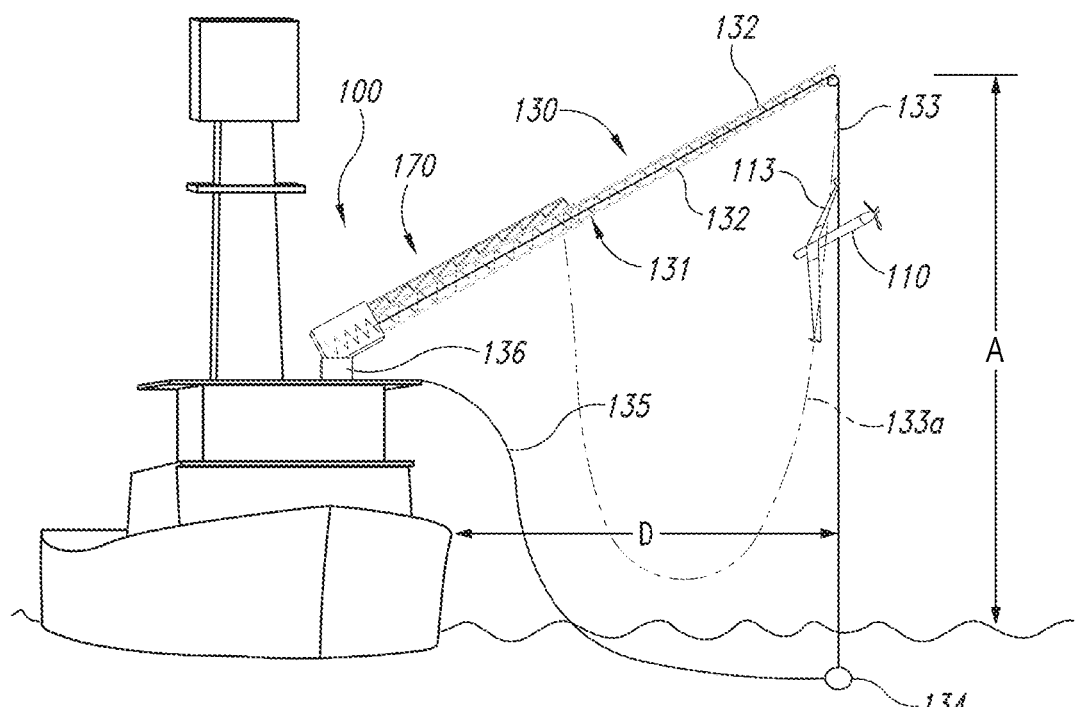

FIGS. 1A-1B illustrate overall views of systems and methods for capturing UAVs in accordance with embodiments of the present technology. Further details of representative capture devices are discussed with reference to FIGS. 2-10D. Beginning with FIG. 1A, a representative UAV 110 can be captured by an aircraft handling system 100 positioned on a support platform 101. In one embodiment, the support platform 101 can include a boat, ship, or other water vessel 102. In other embodiments, the support platform 101 can include other structures, for example, a building, a truck or other land vehicle, or an airborne vehicle, such as a balloon, helicopter, or other multirotor vehicle, or the aircraft handling system can be placed directly on the ground. In many of these embodiments, the aircraft handling system 100 can be configured solely to retrieve the UAV 110 or, in particular embodiments, it can be configured to both launch and retrieve the UAV 110. The UAV 110 can include a fuselage 111 and wings 113 (or a blended wing/fuselage), and is propelled by a propulsion system 112 (e.g., a piston-driven propeller).

Referring now to FIG. 1B, the aircraft handling system 100 can include a recovery system 130 integrated with a launch system 170. In one aspect of this embodiment, the recovery system 130 can include an extendable boom 131 having a plurality of segments 132. The boom 131 can be mounted on a rotatable base 136 or turret for ease of positioning. The segments 132 are initially stowed in a nested or telescoping arrangement and are then deployed to extend outwardly as shown in FIG. 1B. In other embodiments, the extendable boom 131 can have other arrangements, such as a scissors arrangement, a parallel linkage arrangement or a knuckle boom arrangement. In any of these embodiments, the extendable boom 131 can include a recovery line or capture line 133 extended by gravity or other forces. In one embodiment, the recovery line 133 can include 0.25 inch diameter polyester rope, and in other embodiments, the recovery line 133 can include other materials and/or can have other dimensions (e.g., a diameter of 0.3125 inch). In any of these embodiments, a spring or weight 134 at the end of the recovery line 133 can provide tension in the recovery line 133. The aircraft handling system 100 can also include a retrieval line 135 connected to the weight 134 to aid in retrieving and controlling the motion of the weight 134 after the aircraft recovery operation has been completed. In another embodiment, a different recovery line 133a (shown in dashed lines) can be suspended from one portion of the boom 131 and can attach to another point on the boom 131, in lieu of the recovery line 133 and the weight 134.

In one aspect of this embodiment, the end of the extendable boom 131 can be positioned at an elevation A above the local surface (e.g., the water shown in FIG. 1B), and a distance D away from the nearest vertical structure projecting from the local surface. In one aspect of this embodiment, the elevation A can be about 15 meters and the distance D can be about 10 meters. In other embodiments, A and D can have other values, depending upon the particular installation, the size of the UAV 110, and/or other factors. For example, in one particular embodiment, the elevation A can be about 17 meters when the boom 131 is extended, and about 4 meters when the boom 131 is retracted. The distance D can be about 8 meters when the boom 131 is extended, and about 4 meters when the boom 131 is retracted. In a further particular aspect of this embodiment, the boom 131 can be configured to carry both a vertical load and a lateral load via the recovery line. For example, in one embodiment, the boom 131 can be configured to capture an UAV 110 having a weight of about 30 pounds, and can be configured to withstand a side load of about 400 pounds, corresponding to the force of the impact between the UAV 110 and the recovery line 133 with appropriate factors of safety.

In any of the foregoing embodiments, the UAV 110 is captured when it flies into the recovery line 133. Once captured, the UAV 110 is suspended from the recovery line, e.g., by one of the wings 113. Further details of apparatuses and methods for capturing the UAV 110 are described below with reference to FIGS. 2-10D.

Figure 2:
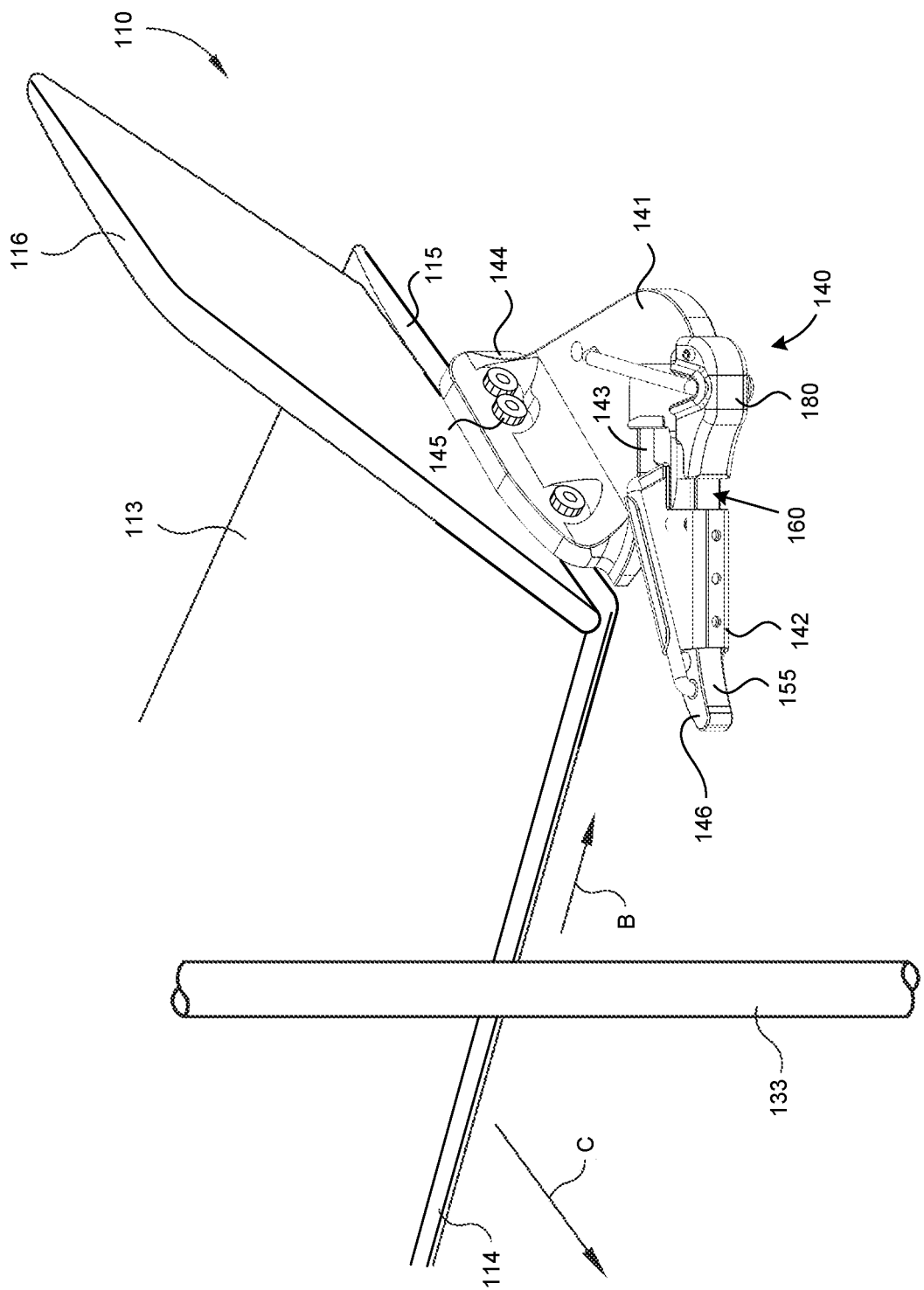
FIG. 2 is a partially schematic, isometric illustration of a line capture device carried by a UAV in accordance with an embodiment of the present technology.

FIG. 2 is a partially schematic, isometric illustration of an outboard portion of the wing 113 of the UAV 110 shown in FIG. 1B. The wing 113 can include a winglet 116 in the illustrated embodiment and may have no winglets in other embodiments. In one aspect of the illustrated embodiment, the wing 113 includes a leading edge 114 (which can, but need not be swept), an outboard edge 115, and a line capture device 140 positioned at or near the outboard edge 115. In other embodiments, each wing 113 can include a plurality of line capture devices 140 located along the span of the wing 113, or a single line capture device located away from the outboard edge 115. In any of these embodiments, the line capture device 140 can have a cleat-type configuration. The line capture device 140 can include a line capture device body 141 with a bracket or flange 144 that is attached to the wing 113, e.g., with bolts 145.

In operation, the line capture device 140 engages the recovery line 133 to releasably and securely attach the UAV 110 to the recovery line 133. Accordingly, the device 140 can include a line slot 143 positioned in the body 141, and retainer 142 movably attached to the body 141. As the UAV 110 flies toward the recovery line 133 (as indicated by arrow C), the recovery line 133 strikes the wing leading edge 114 and causes the UAV 110 to yaw toward the recovery line 133, which then slides outboard along the leading edge 114 toward the line capture device 140 (as indicated by arrow B). The recovery line 133 then passes into the line slot 143 and is retained in the line slot 143 by the retainer 142, as described in greater detail below. If the UAV 110 is not properly aligned with the recovery line 133 during its approach, the recovery line 133 may strike the line capture device 140 instead of the leading edge 114. In one embodiment, the body 141 includes a guide portion 146 having a body leading edge 155 that is swept aft so as to deflect the recovery line 133 away from the UAV 110. This can prevent the recovery line 133 from fouling and can reduce the yawing moment imparted to the UAV 110, allowing the UAV 110 to recover from the missed capture and return for another capture attempt.

As described above, the recovery line 133 travels outboard along the wing leading edge 114 toward the line capture device 140. As the recovery line 133 enters the line slot 143, it forces the retainer 142 to move from the closed position shown in FIG. 2 to an open position. The recovery line 133 travels within the line slot 143 and a locking device 160 engages the retainer 142 to prevent the retainer 142 from opening, either under the force of the recovery line 133, or otherwise. After the aircraft has been successfully captured, an operator uses a release device 180 to disengage the locking device 160 and remove the UAV 110 from the recovery line 133. Further details of this operation are described below with reference to FIGS. 3A-7B.

FIGS. 3A and 3B are plan and isometric views, respectively, of the capture device 140 shown in FIG. 2. The line slot 143 has an open end 150 and a closed end 151. The retainer 142 can include a flat portion 147 that extends over the line slot 143 when the retainer 142 is in a first or closed position, as illustrated in FIGS. 3A and 3B. The retainer 142 can pivot relative to the body 141, and can be biased towards the closed position with a retainer spring 148. In a particular embodiment, the spring 148 includes a wire that extends downwardly into and through a first aperture 156a, then back upwardly through a second aperture 156b, so as to allow the retainer 142 to pivot about an axis extending upwardly and downwardly through the first aperture 156a, as indicated by arrow E. The retainer 142 can include a notch 149 that receives the locking device 160, as described further below.

The locking device 160 can include a locking element 165 that slides axially within a lock groove 166, as indicated by arrow F. The locking element 165 can include a protrusion 164 that is positioned underneath the flat portion 147 of the retainer 142 when the locking device 160 is not engaged (e.g., when the locking device 160 is in an unlocked position). When the locking device 160 is not engaged, the retainer 142 is free rotate freely as indicated by arrow E, while the flat portion 147 rotates over the protrusion 164 below. The protrusion 164 pops into the notch 149 when the locking device 160 is engaged, as is described further below with reference to FIGS. 5A and 5B.

The locking device 160 can further include a line strike device 161 positioned toward the closed end 151 of the line slot 143. The line strike device 161 is positioned to pull the locking element 165 from left to right when the recovery line 133 strikes the line strike device 161. Accordingly, the line strike device 161 can include a line strike flat portion 162 that extends over and across the capture slot 143, and can move between an unstruck position and a struck position under the force of the recovery line 133.

The release device 180 is coupled to the locking device 160, e.g., via the line strike device 161 and/or the locking element 165. The release device 180 can include a release device spring 181 that biases the release device 180 toward an engaged position shown in FIGS. 3A and 3B. In a particular embodiment, the release device spring 181 can include a wire that operates generally similarly to the retainer spring 148 described above. The release device 180 can have a contoured surface allowing a user to easily engage and move it from left to right (or counter-clockwise), indicated by arrow G, to release the locking device 160, as will be described further below with reference to FIGS. 7A and 7B.

Figures 4A, 4B:
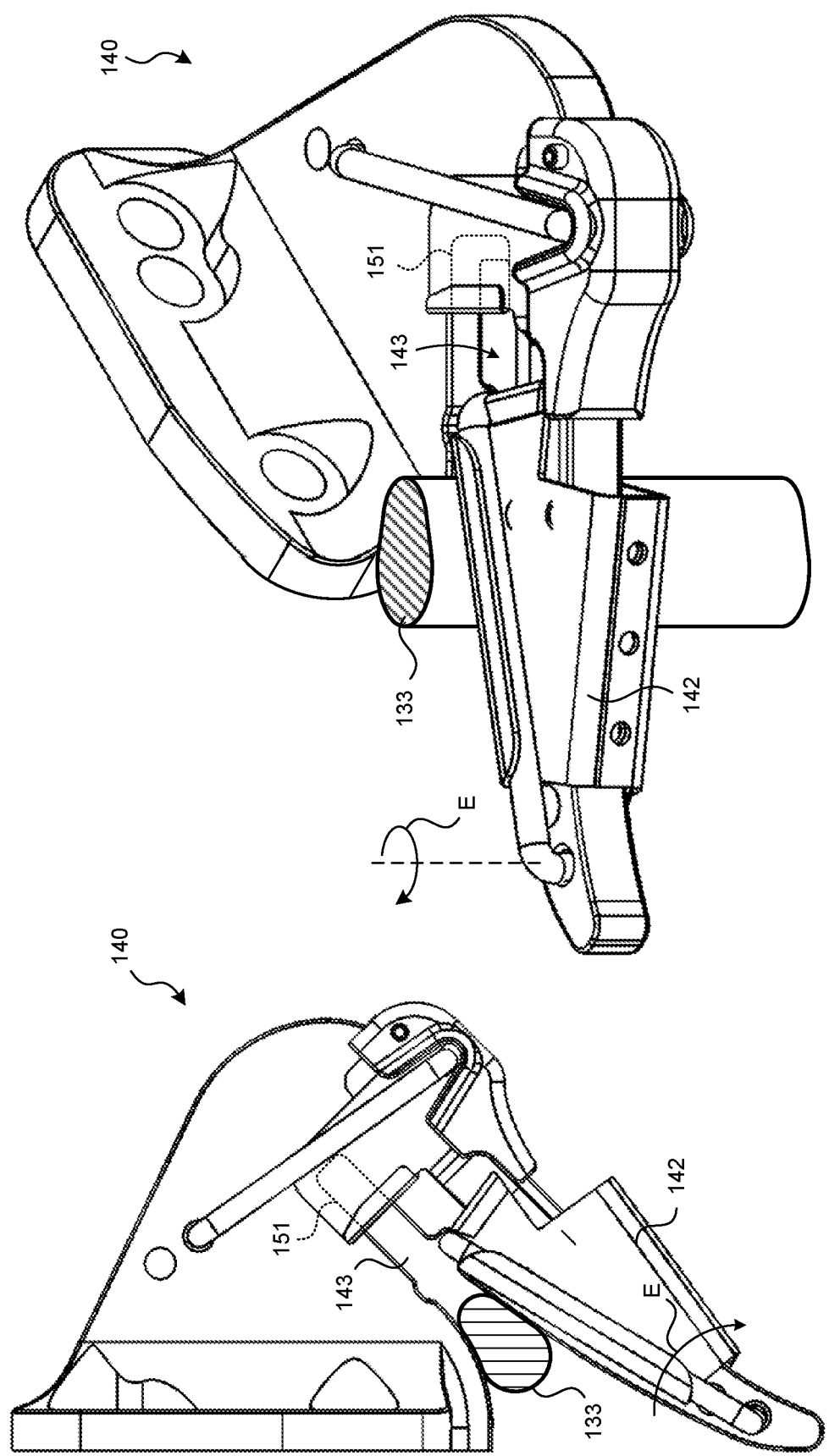
FIGS. 4A and 4B are partially schematic, plan and isometric views, respectively, of the line capture device shown in FIG. 2, with the recovery line positioned in the line slot, in accordance with an embodiment of the present technology.

FIGS. 4A and 4B are partially schematic plan and isometric views, respectively, of the line capture device 140 shown in FIGS. 3A and 3B, after the recovery line 133 has entered the line capture slot 143 and forced the retainer 142 to pivot away from the line capture slot 143, as indicated by arrow E. The recovery line 133 continues to move along the line capture slot 143 toward the closed end 151. The portion of the recovery line 133 within the capture slot 143 can assume an elliptical and/or otherwise non-circular cross-sectional shape due to the confined width of the capture slot 143, as shown in FIG. 4A and several subsequent Figures.

Figure 5B:
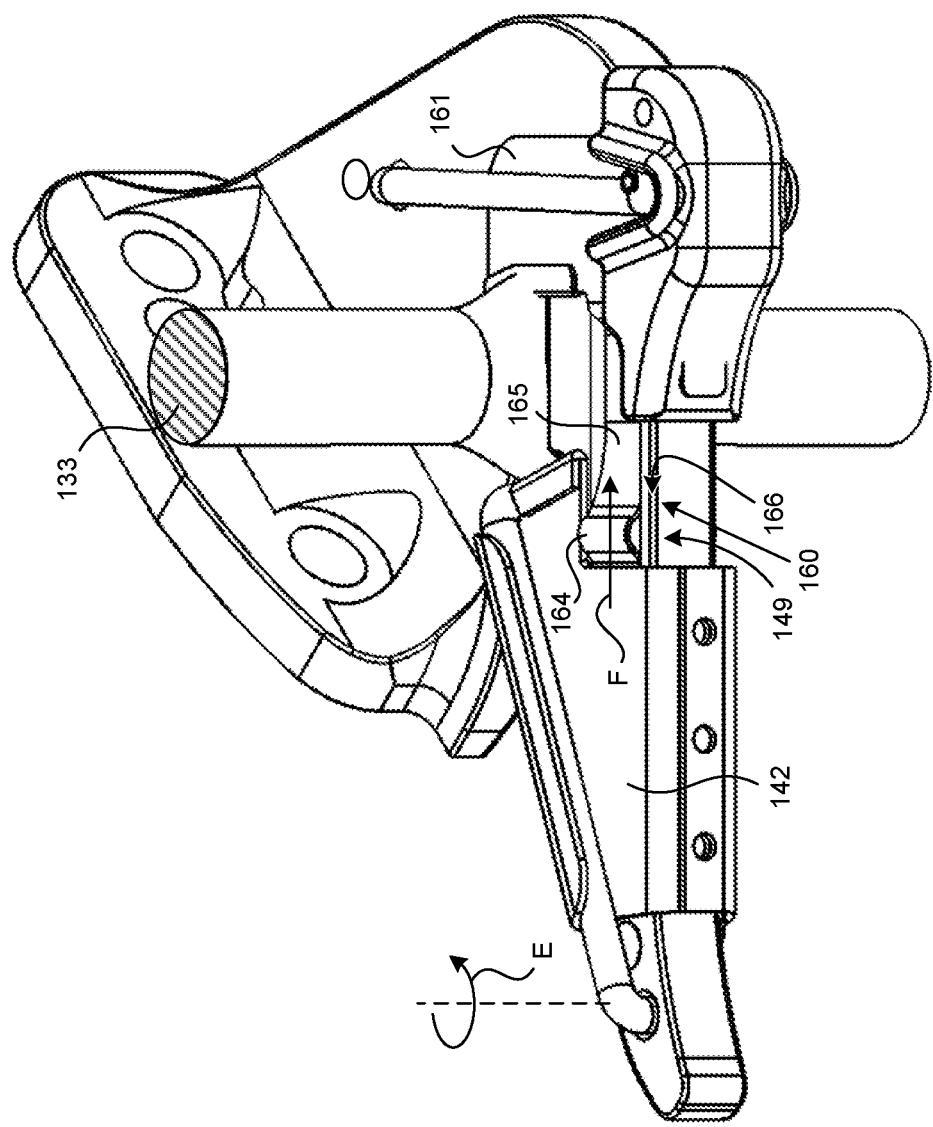
FIGS. 5A and 5B are partially schematic, plan and isometric views, respectively, of the line capture device shown in FIG. 2, with a locking device in a locked position, in accordance with an embodiment of the present technology.
Figure 5A:
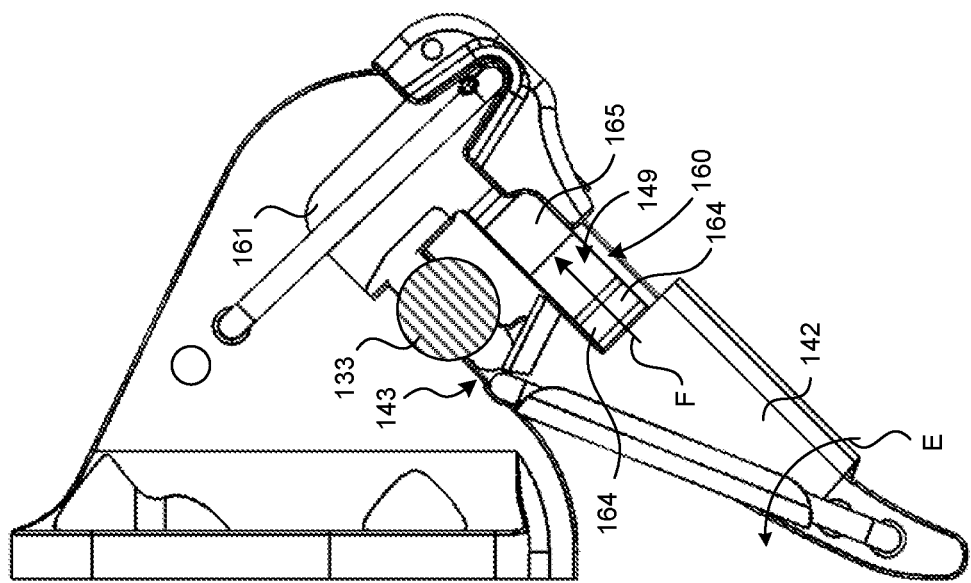

In FIGS. 5A and 5B, the recovery line 133 has struck the line strike device 161, causing the locking element 165 to slide within its lock groove 166 as indicated by arrow F. As a result of this movement, the protrusion 164 emerges from beneath the retainer 142 and into the notch 149. The protrusion 164 is biased upwardly so as to spring upwardly into the notch 149 after the retainer 142 (which is biased toward its closed position) rotates back to its closed position, as indicated by arrow E. Accordingly, the recovery line 133 is now positioned toward the closed end 151 (FIG. 4B) of the line slot 143 and the retainer 142 is in its closed position to prevent the recovery line 133 from exiting the line slot 143. In addition, the locking device 160 prevents the retainer 142 from moving away from its closed position. Accordingly, if another portion of the recovery line 133 outside the capture slot 143 loops upwardly and strikes the retainer 142, the retainer 142 will not move from its closed position. An advantage of this feature is that it can prevent the retainer 142 from inadvertently being reopened as the recovery line 133 bounces, loops and/or otherwise moves around during the capture operation. Such movement might otherwise not only cause the retainer 142 to open, but also cause the captured portion of the recovery line 133 to move out of capture slot 143 and thus prevent the successful capture of the UAV 110 (FIGS. 1A, 1B).

Figure 6B:
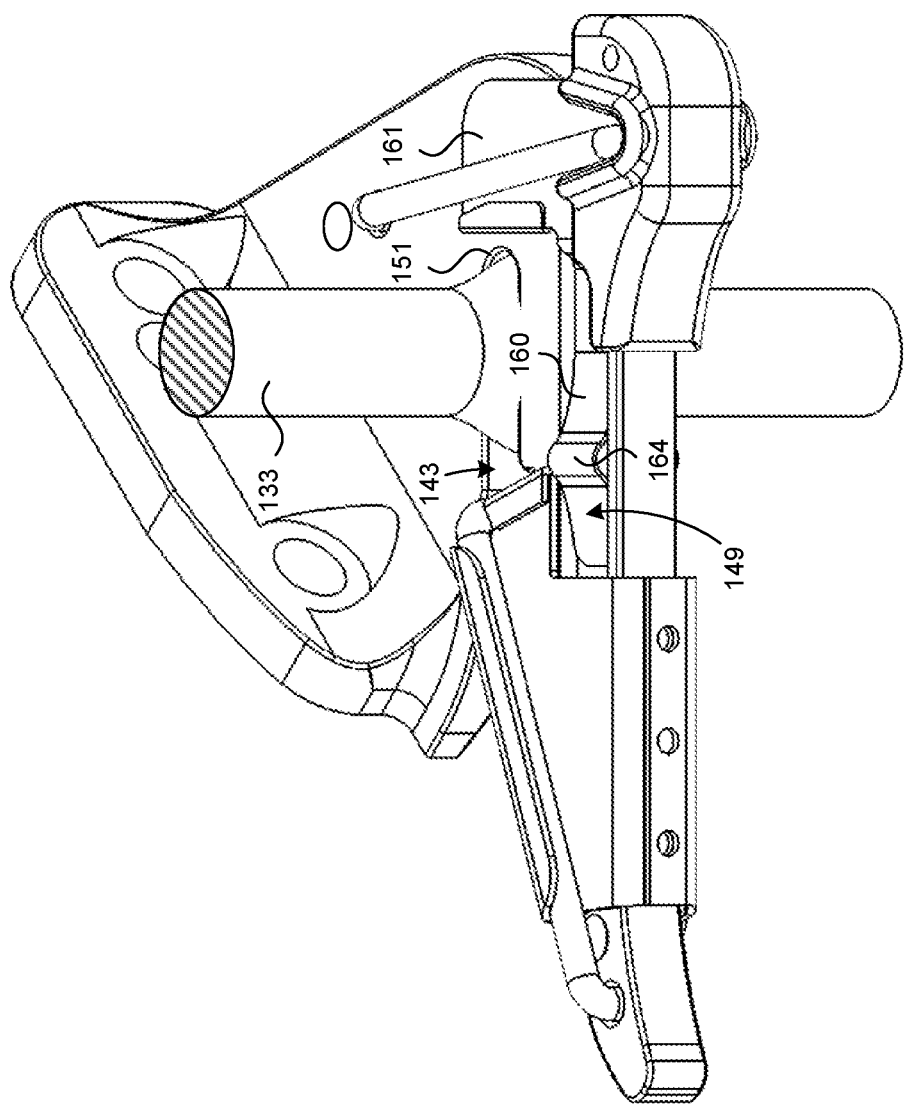
FIGS. 6A and 6B are partially schematic, plan and isometric views, respectively, of the line capture device shown in FIG. 2, with the recovery line fully engaged in the capture slot, in accordance with an embodiment of the present technology.
Figure 6A:
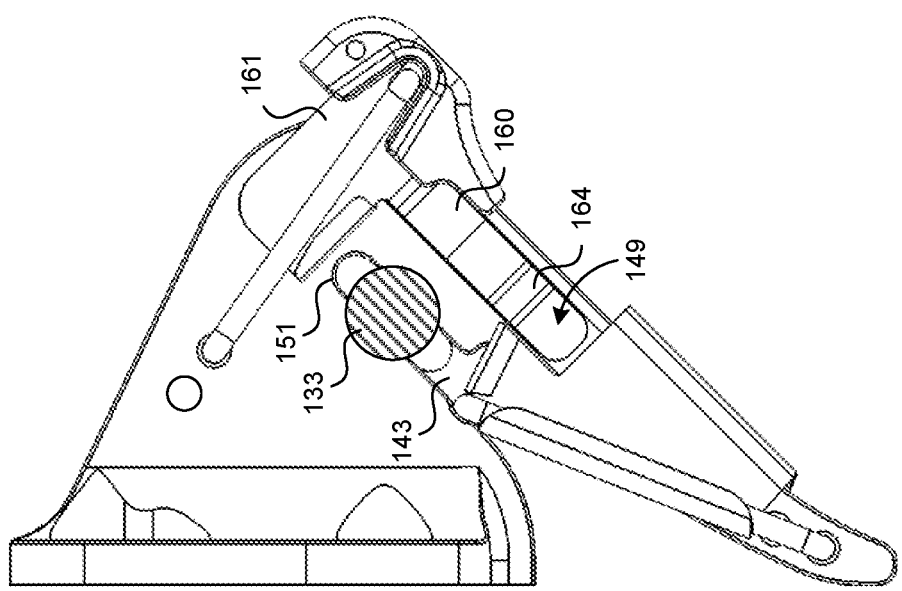

As shown in FIGS. 6A and 6B, the recovery line 133 has now traveled to the closed end 151 of the slot 143 and is fully engaged in the capture slot 143. The line strike device 161 has moved clear of the capture slot 143 under the force of the recovery line 133, but the locking device 160 (e.g., the protrusion 164) remains positioned in the notch 149 of the retainer 142 to prevent the retainer 142 from inadvertently opening. The UAV is now captured.

Figure 7B:
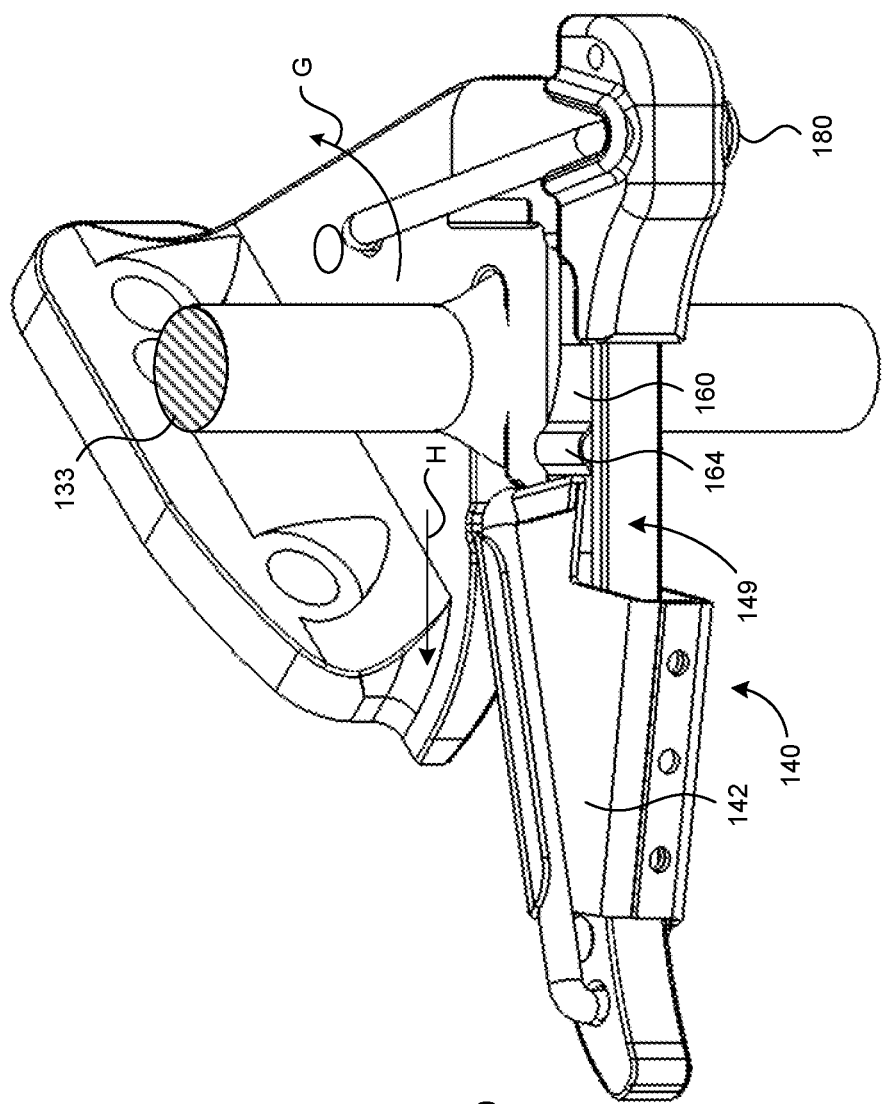
FIGS. 7A and 7B are partially schematic, plan and isometric views, respectively, of the line capture device shown in FIG. 2 with the locking device shown in an unlocked position in accordance with an embodiment of the present technology.
Figure 7A:
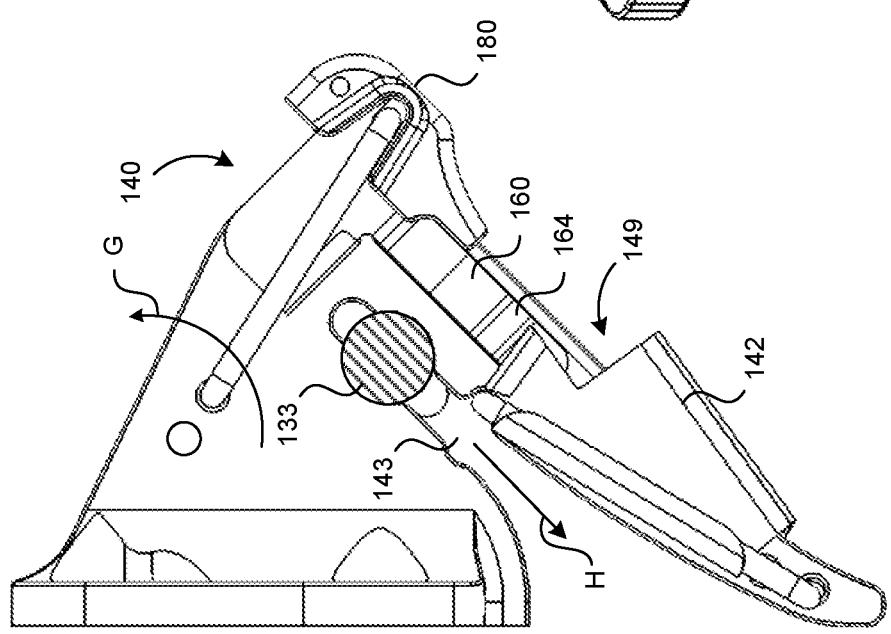

FIGS. 7A and 7B illustrate a representative operation for removing the UAV from the recovery line 133 by unlocking and disengaging the line capture device 140. In particular, an operator can slide and/or pivot the release device 180 as indicated by arrow G to pull the locking device 160 out of engagement with the retainer 142. In particular, the protrusion 164 is pulled away from the notch 149 (as is best seen in FIG. 7B), allowing the retainer 142 to be pivoted to its open position (as is best seen in FIG. 7A). With the retainer 142 in its open position, the user can pull the recovery line 133 out of the slot 143, as indicated by arrow H, and release the UAV. Accordingly, the locking device 160 can include at least one unlocked position, and in this embodiment, two unlocked positions: a first unlocked position shown in FIGS. 3A and 3B (prior to the entry of the recovery line 133 into the line slot 143), and a second unlocked position shown in FIGS. 7A, 7B (after the recovery line 133 has entered the line slot 143, but before the UAV has been released).

Figure 8B:
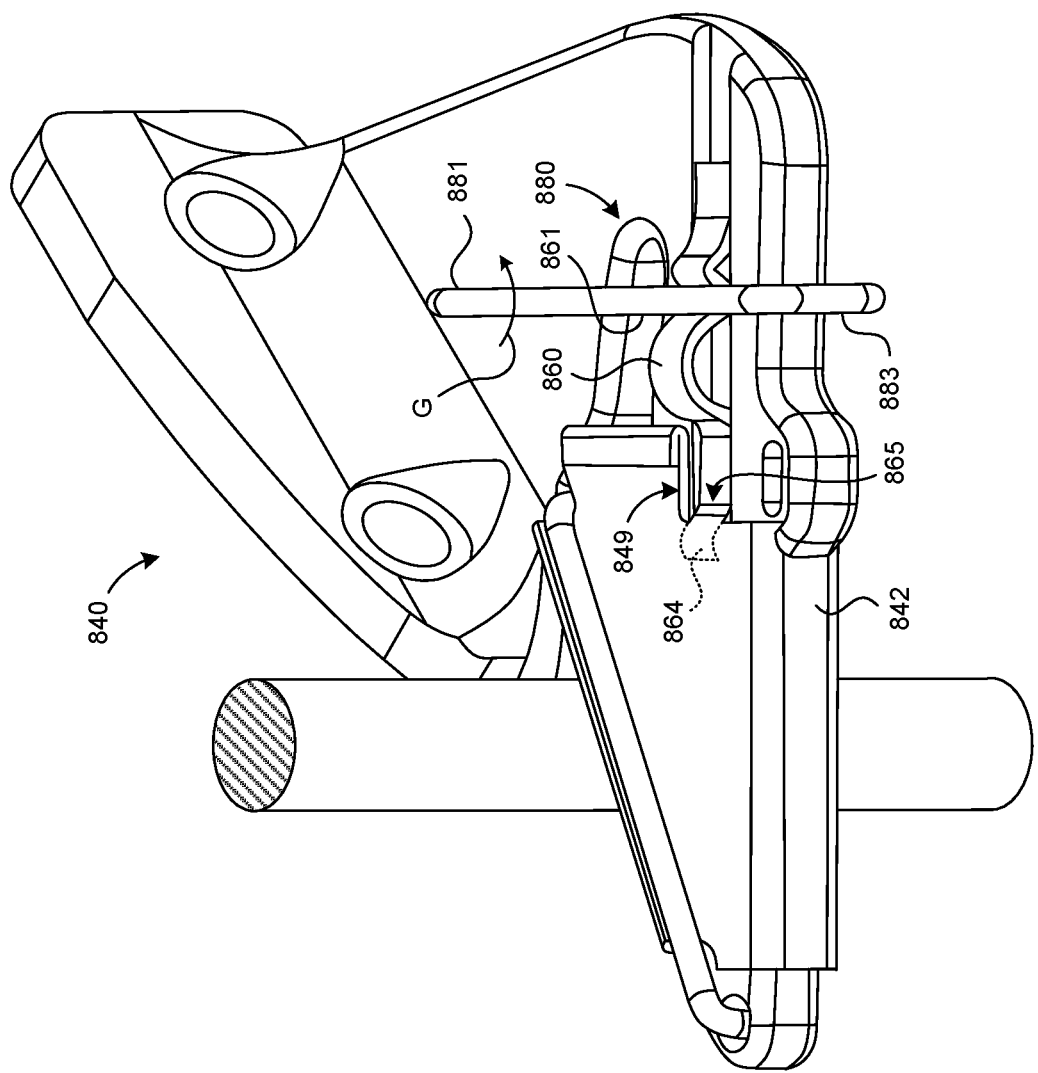
FIGS. 8A and 8B are partially schematic, plan and isometric views, respectively, of a line capture device having a retainer and locking mechanism configured in accordance with another embodiment of the present technology.
Figure 8A:
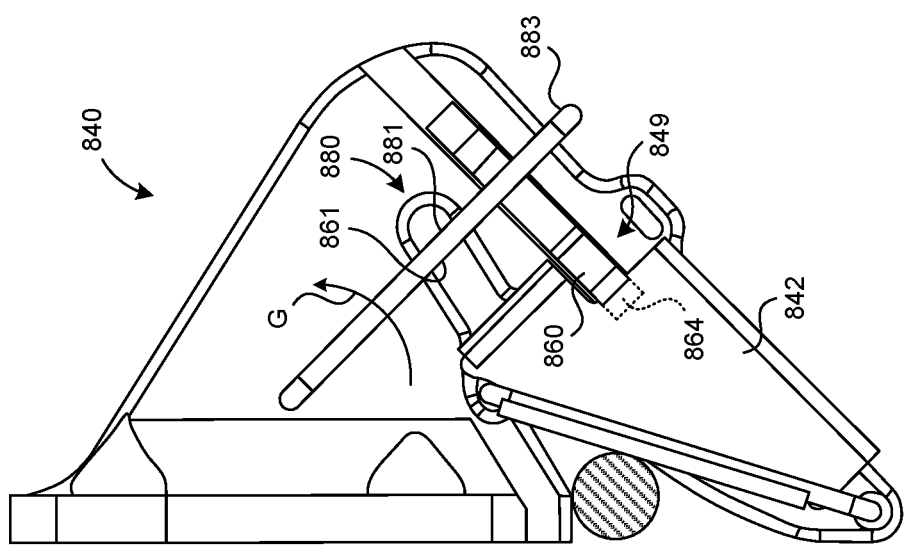

FIGS. 8A and 8B schematically illustrate a line capture device 840 having a construction generally similar to that described above with reference to FIGS. 2-7B, but with a simplified release device 880. For example, the release device 880 can include just a release device spring 881 (e.g., a wire spring), which operates as a line strike device, a spring, and the release device itself. A corresponding retainer 842 and locking device 860 operate in a manner generally similar to that discussed above with reference to FIGS. 3A-7B. In operation, the recovery line 133 strikes a line strike portion 861 to pull a locking element 865 (e.g., having a protrusion 864) from left to right to lock the retainer 842. To unlock the capture device 840, the operator engages an outwardly-facing wire portion 883 of the release device 880 and rotates it as indicated by arrow G to pull the protrusion 864 out of the corresponding notch 849 in a manner generally similar to that discussed above with reference to FIGS. 7A-7B.

Figure 9B:
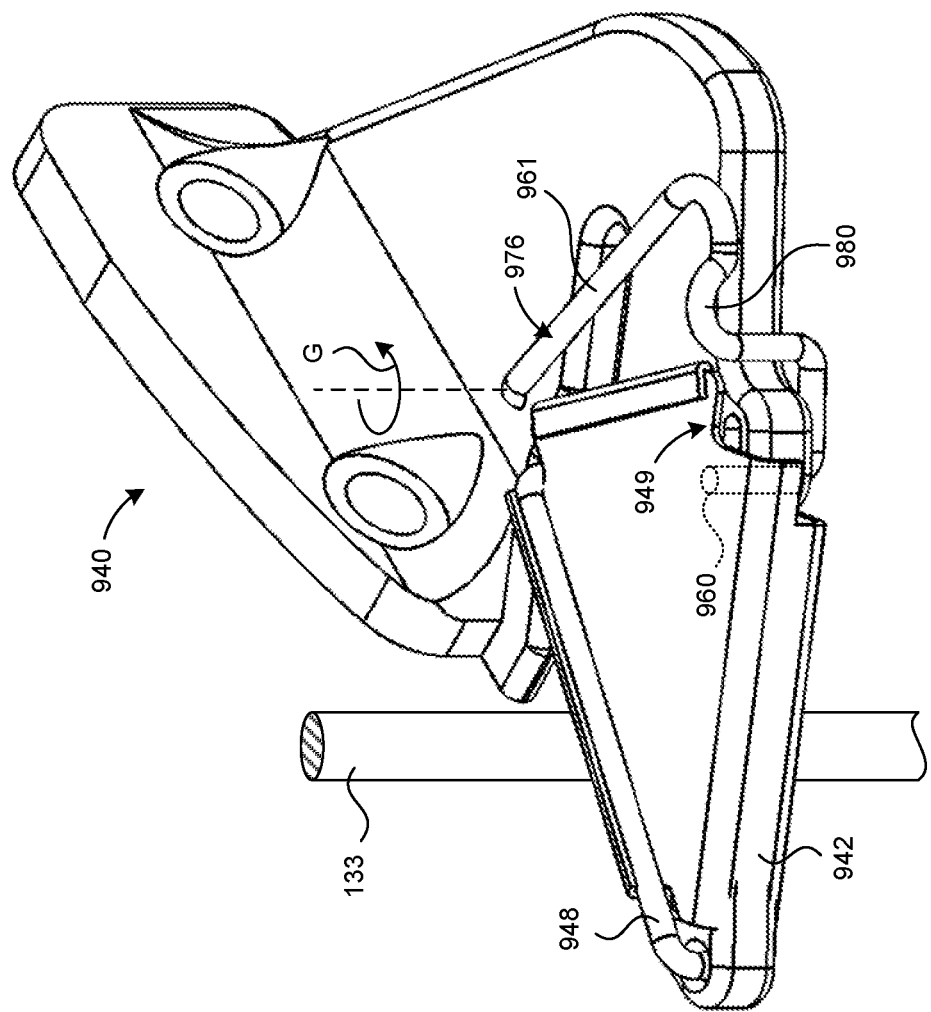
FIGS. 9A and 9B are plan and isometric views, respectively, of a capture device having a locking mechanism configured in accordance with yet another embodiment of the present technology.
Figure 9A:
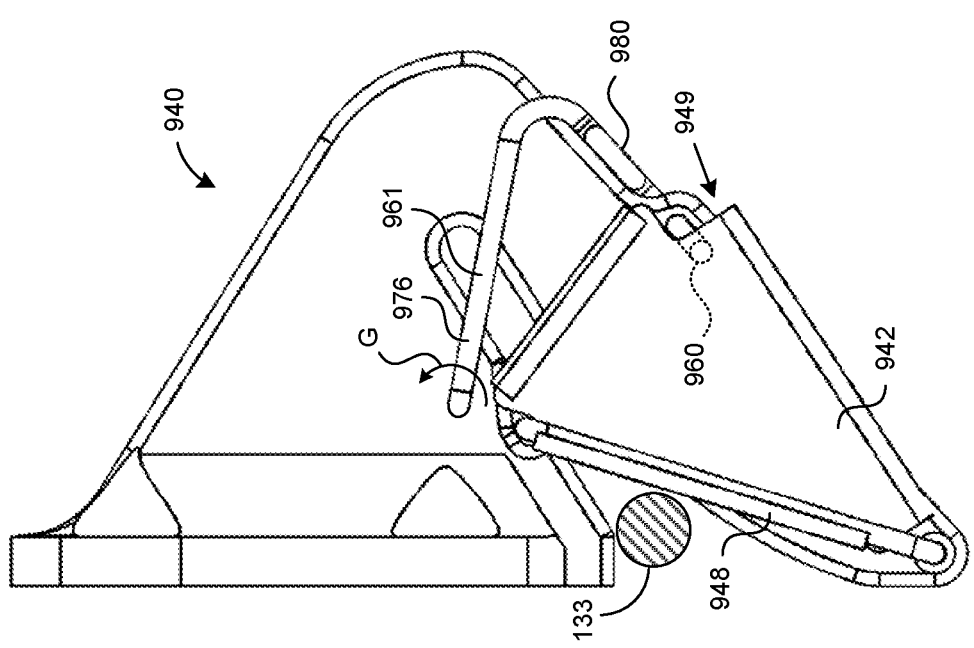

FIGS. 9A and 9B schematically illustrate a line capture device 940 configured in accordance with still another embodiment of the present technology. In this embodiment, a single element (e.g., a unitary wire) can include, and can perform the functions of, the line strike device, locking device, and release device described above. In particular, the line capture device 940 can include a retainer 942 that is biased to a closed position via a retainer spring 948 that operates in generally the same manner described above with reference to FIGS. 3A-7B. A wire 976 (e.g., a single wire) includes a line strike portion 961 that receives the impact of the recovery line 133 and pivots as indicated by arrow G. The same wire 976 can include a locking portion 960 that is shown in its initial position beneath the retainer 942 in FIGS. 9A-9B. When the recovery line 133 strikes the line strike portion 961 and pivots the wire 976 counterclockwise, as indicated by arrow G, the locking portion 960 emerges from underneath the retainer 942 and fits into a corresponding notch 949 to prevent the retainer 942 from moving from the closed position to the open position. The wire 976 can still further include a release portion 980 having a curved or otherwise suitable shape that the operator can manipulate (e.g., with the thumb) to move the locking portion 960 away from the retainer 942 and unlock the locking portion in a manner generally similar to that described above.

FIGS. 10A-10C 10D are partially schematic, plan view illustrations of a line capture device 1040 configured in accordance with still another embodiment of the present technology. In one aspect of this embodiment, the line capture device 1040 includes a body 1041 having a line capture slot 1043, and a retainer 1042 pivotably attached to the body 1041 so as to pivot about a pivot axis 1053 that extends inwardly and outwardly out of the plane of FIGS. 10A, 10B and 10C-10D. The retainer 1042 has multiple lobes 1052, illustrated as a first lobe 1052a, a second lobe 1052b, and a third lobe 1052c. The pivotable connection between the body 1041 and the retainer 1042 can include a biasing device 1054 that operates as a torque spring. The biasing device 1054 can bias the retainer 1042 to an initial or starting position shown in FIG. 10A.

Figure 10B:
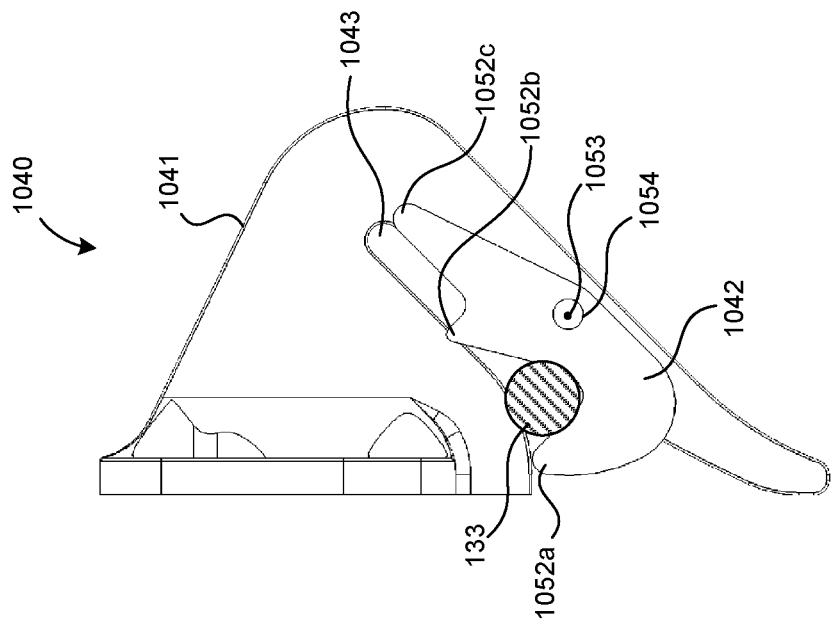
FIGS. 10A-10D illustrate plan views of a line capture device having a retainer with three lobes positioned in a first, second, and third orientation, respectively, in accordance with still another embodiment of the present technology.
Figure 10A:
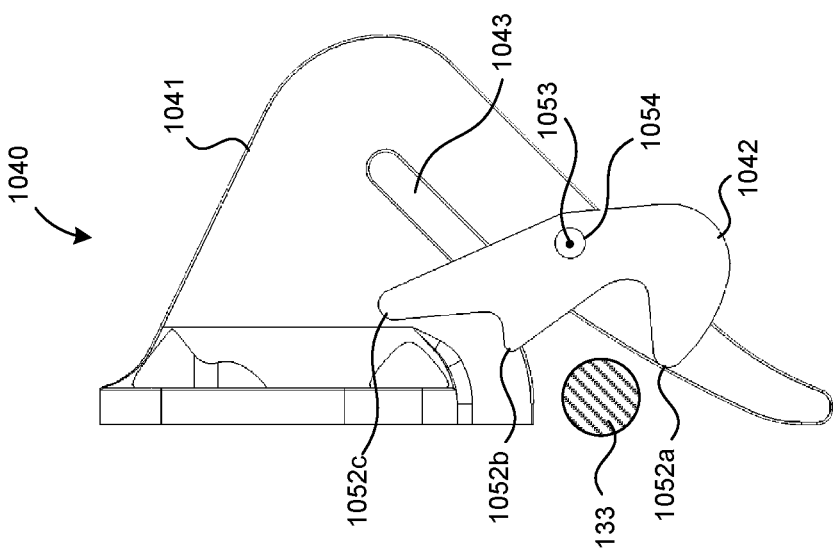
Figure 10D:
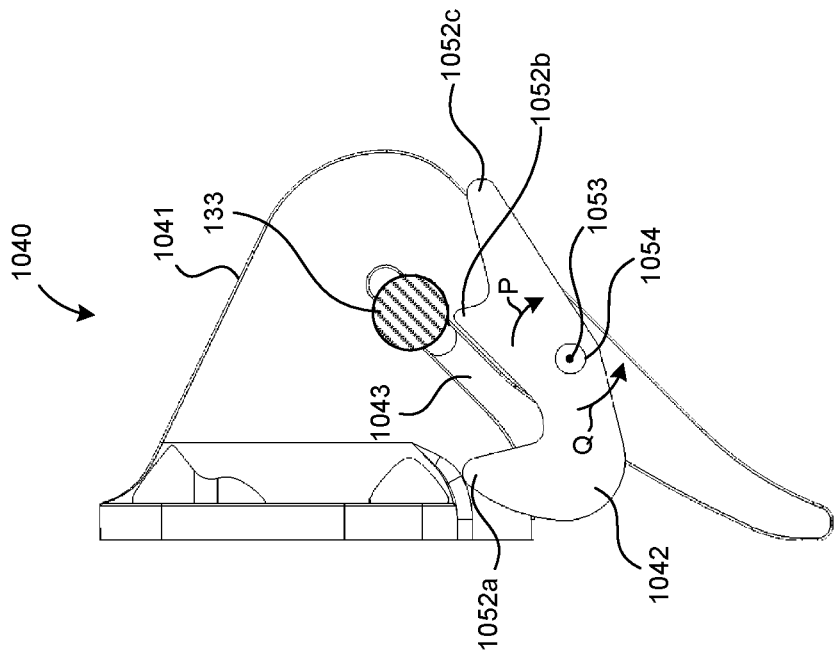
Figure 10C:
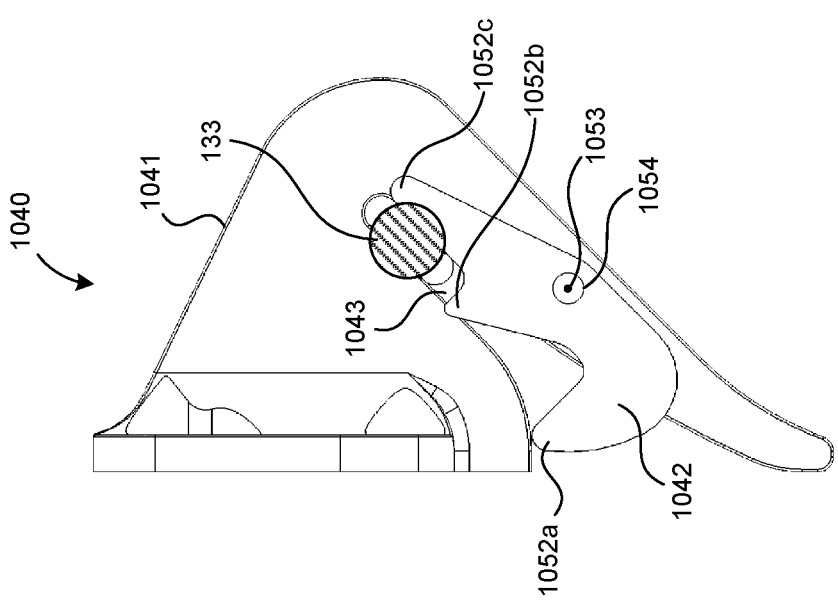

In operation, the line capture device is initially set to the initial or starting position shown in FIG. 10A, with the first lobe 1052a positioned on one side of the line capture slot 1043, and the second lobe 1052b positioned in the line capture slot 1043. When the recovery line 133 strikes the second lobe 1052b as it enters the slot, the force pivots the retainer 1042 clockwise about the pivot axis 1053 so as to move the second lobe 1052b out of the line capture slot 1043, allowing the recovery line 133 to move into the line capture slot 1043. In FIG. 10B, the second lobe 1052b is in the process of rotating clockwise under the force of the incoming recovery line 133. The first lobe 1052a rotates to close off the line capture slot 1043 behind the entering recovery line 133, as is also shown in FIG. 10B. In FIG. 10C, the retainer 1042 has rotated counterclockwise under the restoring force of the biasing device 1054 to further constrain the motion of the now-captured recovery line 133. In this instance, both the first lobe 1052a and the second lobe 1052b can prevent another portion of the recovery line 133 (e.g., a looping portion) from entering the line capture slot 1043. In FIG. 10D, an operator has begun to disengage the capture line 133 from the line capture device 1040 by rotating the retainer 1042 clockwise (as indicated by arrow P), allowing the operator to move the capture line 133 past the second lobe 1052b and toward the entrance of the line capture slot 1043. Once the capture line 133 is past the second lobe 1052b, the operator can rotate the retainer 1042 counterclockwise, as indicated by arrow Q, until the retainer 1042 has the position shown in FIG. 10A. At that point, the operator can disengage the capture line 133 by moving it past the first lobe 1052a and out of the line capture slot 1043.

Devices in accordance with embodiments of the technology described above with reference to FIGS. 10A-10D can perform functions similar or identical to those described above with reference to FIGS. 2-9B. For example, when the line capture device 1040 is in the configuration shown in FIG. 10C, the second and third lobes 1052b, 1052c can prevent the capture line 133 from exiting the line capture slot 1043, effectively locking the device until the operator unlocks the device (as shown in FIG. 10D). In addition, the first lobe 1052a can prevent another capture line, or another portion of the capture line 133, from entering and/or opening the line capture slot 1043.

One feature of at least some of the embodiments described above with reference to FIGS. 1A-10D is that the line capture devices can include a locking mechanism or device. The locking device at least restricts (and typically prevents) the retainer from opening, once the capture device has successfully engaged with a recovery line, unless the operator deliberately unlocks the device. An advantage of this arrangement is that it can reduce or eliminate the likelihood for the recovery line to "loop" or otherwise undergo a motion that opens the retainer, which can allow an already-engaged recovery line to escape from the line slot. As a result, the likelihood for a capture maneuver to fail can be significantly reduced.

From the foregoing, it will be appreciated that specific embodiments of the technology have been described herein for purposes of illustration, but that various modifications may be made without deviating from the technology. For example, several of the components described above and illustrated in FIGS. 1A-10D can have shapes and arrangements other than those specifically shown and described. In particular embodiments, multiple functions can be performed by individual components, for example, (without limitation) as illustrated in FIGS. 8A-9B.

Certain aspects of the technology described in the context of particular embodiments may be combined or eliminated in other embodiments. For example, features of the release device 180 described above with reference to FIGS. 3A-7B may be added to the device described above with reference to FIGS. 9A-9B to make operation of the device more comfortable. Elements of the locking devices and/or release devices discussed above with reference to FIGS. 3A-9B can be applied to the device shown in FIGS. 10A-10D. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

What is claimed is:

1. A line capture device configured to be attached to a wing of an unmanned aerial vehicle (UAV), the line capture device comprising:
   a body having a line capture slot, the line capture slot having an open end and a closed end; and
   a retainer having a first lobe, a second lobe, and a third lobe, the retainer being movable relative to the body between a first position in which the first and third lobes are positioned on opposite sides of the line capture slot and the second lobe is positioned over the line capture slot, and a second position in which the first and second lobes are positioned over the line capture slot and the third lobe is positioned clear of the line capture slot.

2. The line capture device of claim 1, wherein the retainer is pivotable relative to the body between the first and second positions.

3. The line capture device of claim 1, further comprising a biasing device coupled between the body and the retainer, the biasing device configured to bias the retainer away from the second position and toward the first position.

4. The line capture device of claim 1, wherein the retainer is configured to be positioned in the first position prior to the retainer being engaged by a recovery line.

5. The line capture device of claim 4, wherein the retainer is configured to be positioned in the second position in response to the retainer being engaged by a first portion of the recovery line.

6. The line capture device of claim 5, wherein the first lobe is configured to block access to the open end of the line capture slot when the retainer is in the second position.

7. The line capture device of claim 5, wherein the first lobe is configured to prevent a second portion of the recovery line from being captured within the line capture slot when the retainer is in the second position.

8. The line capture device of claim 1, wherein the retainer is configured to capture a recovery line in the line capture slot between the first lobe and the closed end in response to the retainer being engaged by the recovery line.

9. The line capture device of claim 1, wherein the retainer is configured to capture a recovery line in the line capture slot between the second lobe and the closed end in response to the retainer being engaged by the recovery line.

10. The line capture device of claim 1, wherein the retainer is further movable to a third position in which the first lobe is positioned over the line capture slot and the second and third lobes are clear of the line capture slot.

11. The line capture device of claim 10, wherein the retainer is configured to enable a recovery line captured in the line capture slot to be moved past the second lobe and toward the open end when the retainer is in the third position.

12. The line capture device of claim 10, wherein the retainer is pivotable relative to the body between the second and third positions.

13. An unmanned aerial vehicle (UAV), comprising
a wing; and
a line capture device attached to the wing, the line capture device including:
   a body having a line capture slot, the line capture slot having an open end and a closed end; and
   a retainer having a first lobe, a second lobe, and a third lobe, the retainer being movable relative to the body between a first position in which the first and third lobes are positioned on opposite sides of the line capture slot and the second lobe is positioned over the line capture slot, and a second position in which the first and second lobes are positioned over the line capture slot and the third lobe is positioned clear of the line capture slot.

14. The UAV of claim 13, wherein the retainer is pivotable relative to the body between the first and second positions.

15. The UAV of claim 13, wherein the line capture device further includes a biasing device coupled between the body and the retainer, the biasing device configured to bias the retainer away from the second position and toward the first position.

16. The UAV of claim 13, wherein the retainer is configured to be positioned in the first position prior to the retainer being engaged by a recovery line.

17. The UAV of claim 13, wherein the retainer is further movable to a third position in which the first lobe is positioned over the line capture slot and the second and third lobes are clear of the line capture slot.

18. A method, comprising:
moving a retainer of a line capture device relative to a body of the line capture device from a first position to a second position, the line capture device being coupled to a wing of an unmanned aerial vehicle (UAV), the body having a line capture slot including an open end and a closed end, the retainer having a first lobe, a second lobe, and a third lobe, wherein the first and third lobes are positioned on opposite sides of the line capture slot and the second lobe is positioned over the line capture slot when the retainer is in the first position, and wherein the first and second lobes are positioned over the line capture slot and the third lobe is positioned clear of the line capture slot when the retainer is in the second position.

19. The method of claim 18, wherein moving the retainer from the first position to the second position includes pivoting the retainer relative to the body.

20. The method of claim 18, further comprising biasing the retainer away from the second position and toward the first position via a biasing device coupled between the body and the retainer.

* * * * *